(12) United States Patent
Zhang et al.

(10) Patent No.: US 12,184,590 B2
(45) Date of Patent: Dec. 31, 2024

(54) USER EQUIPMENT (UE) FULL DUPLEX (FD) CHARACTERISTICS REPORTING AND COMMUNICATION

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 17/583,065

(22) Filed: Jan. 24, 2022

(65) Prior Publication Data
US 2023/0239131 A1    Jul. 27, 2023

(51) Int. Cl.
*H04L 27/26* (2006.01)
*H04L 5/00* (2006.01)
*H04L 5/16* (2006.01)

(52) U.S. Cl.
CPC .............. *H04L 5/16* (2013.01); *H04L 5/0094* (2013.01); *H04L 27/2607* (2013.01)

(58) Field of Classification Search
CPC ..... H04L 27/2607; H04L 5/0094; H04L 5/14; H04L 5/1469; H04L 5/16; H04L 27/2602
See application file for complete search history.

(56) References Cited

U.S. PATENT DOCUMENTS

2016/0191228 A1* 6/2016 Chen ..................... H04W 76/27
370/254
2021/0314946 A1* 10/2021 Ang ....................... H04L 5/0087

FOREIGN PATENT DOCUMENTS

WO     WO-2017111821 A1 *  6/2017

* cited by examiner

*Primary Examiner* — Melvin C Marcelo
*Assistant Examiner* — Natali Pascual Peguero
(74) *Attorney, Agent, or Firm* — ArentFox Schiff LLP

(57) ABSTRACT

A user equipment (UE) reports, to a base station, UE duplex communication characteristics. The UE then communicates with the base station in accordance with the reported characteristics. The characteristics can include duplex communication modes supported by the UE. The modes can include receiving and transmitting concurrently with the base station; communicating in a first direction with the base station and concurrently communicating in an opposite direction with a second base station; communicating with the i in a first direction concurrent with the base station communicating in an opposite direction with another UE; and communicating in half duplex (HD) with the base station in HD. The UE can receive, from the base station, a command to communicate in a reported mode. In such cases, communicating, by the UE with the base station, in accordance with the reported duplex communication characteristics includes communicating with the base station in the commanded mode.

21 Claims, 9 Drawing Sheets

400

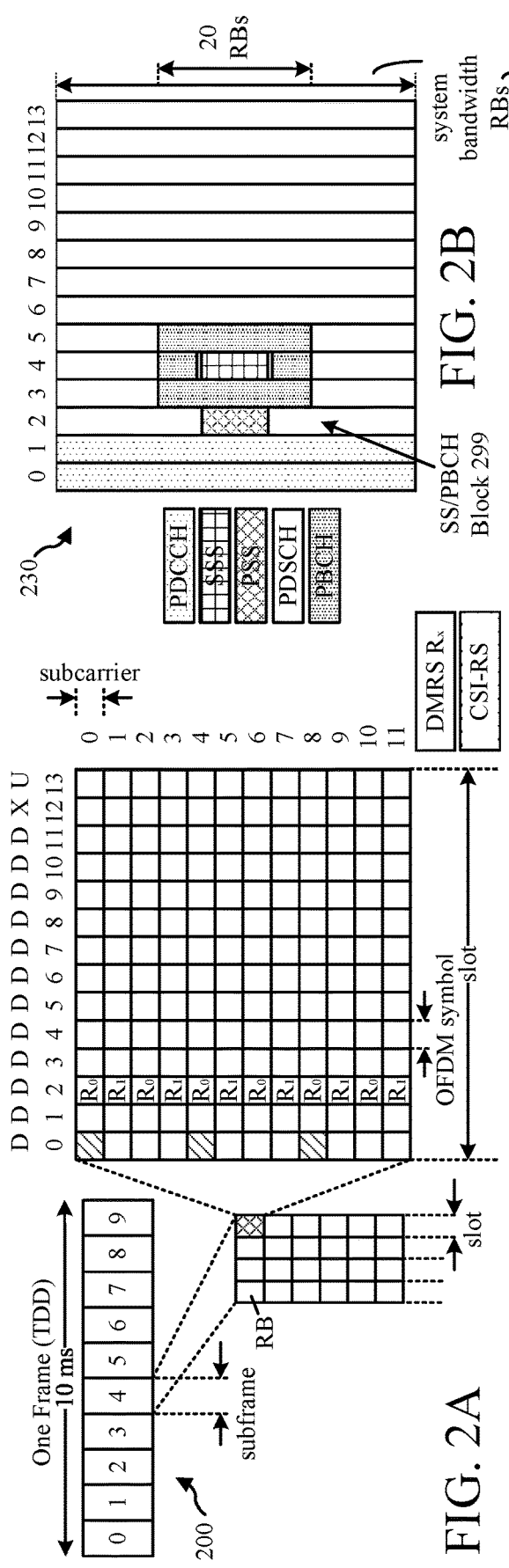
FIG. 2A
FIG. 2B
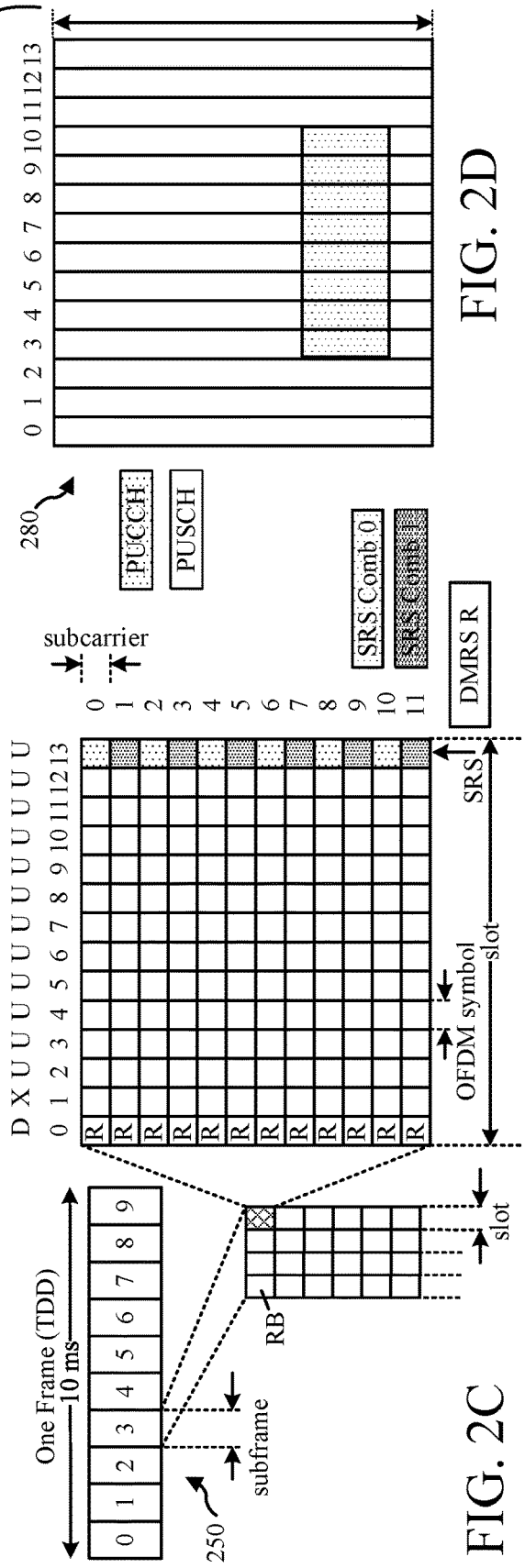
FIG. 2C
FIG. 2D

USER EQUIPMENT (UE) FULL DUPLEX (FD) CHARACTERISTICS REPORTING AND COMMUNICATION

TECHNICAL FIELD

The present disclosure relates generally to communication systems, and more particularly in some examples, to full duplex communication in the radio access network of wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

In a duplex communication system two telecommunication devices can communicate with each in both directions—as opposed to "simplex" systems like convention over-the-air broadcast television. There are two types of duplex communication systems: full-duplex (FD) and half-duplex (HD). In a typical HD telecommunication, two devices can communicate with each other, but the communication is one direction at a time. An example of an HD device is a walkie-talkie, a two-way radio that has a push-to-talk button. For a first user to speak, the first user turns on the device's transmitter and turns off the receiver, preventing the first user from receiving transmissions from the second user's device. To listen to the second user, the first user takes some action to turn on the first device receiver and turns off the first device transmitter. Legacy cellular telephone networks are typically HD networks with downlink and uplink portions separated by either time, i.e., time division duplexing (TDD), or frequency, i.e., frequency division duplexing (FDD)—in essence, emulating FD communication. In a true FD communication system, the devices can communicate with each other simultaneously. One example of an FD communication system is the plain old telephone service (POTS). In POTS, a phone at each end of a circuit switched call can be used to speak and to be heard by each party simultaneously.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

The technology disclosed herein includes method, apparatus, and computer-readable media including instructions for wireless communication. In such technology, a user equipment (UE) reports, to a base station, duplex communication characteristics supported by the UE. The UE then communicates with the base station in accordance with the reported duplex communication characteristics. The characteristics can include duplex communication modes supported by the UE. The modes can include receiving and transmitting concurrently with the base station; communicating in a first direction with the base station and concurrently communicating in an opposite direction with a second base station; communicating with the base station in a first direction concurrent with the base station communicating in an opposite direction with another UE; and communicating in half duplex (HD) with the base station in HD. The UE can receive, from the base station, a command to communicate in a reported mode. In such cases, communicating, by the UE with the base station, in accordance with the reported duplex communication characteristics includes communicating with the base station in the commanded mode.

In some examples, the duplex communication characteristics further comprise duplex communication assistance information. In such examples, where the duplex communication mode is a full duplex mode, assistance information includes a capability of the UE to support one or more of: non-overlapping transmit and receive frequencies, partially overlapping transmit and receive frequencies, and fully-overlapping transmit and receive frequencies. In some such examples, where the assistance information includes a capability of the UE to support non-overlapping transmit frequencies and receive frequencies, the assistance information further comprises a minimum guard band between the non-overlapping transmit frequencies and receive frequencies. In some such examples, the minimum guard band is a function of the channels associated with the non-overlapping transmit frequencies and receive frequencies.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A, FIG. 2B, FIG. 2C, and FIG. 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
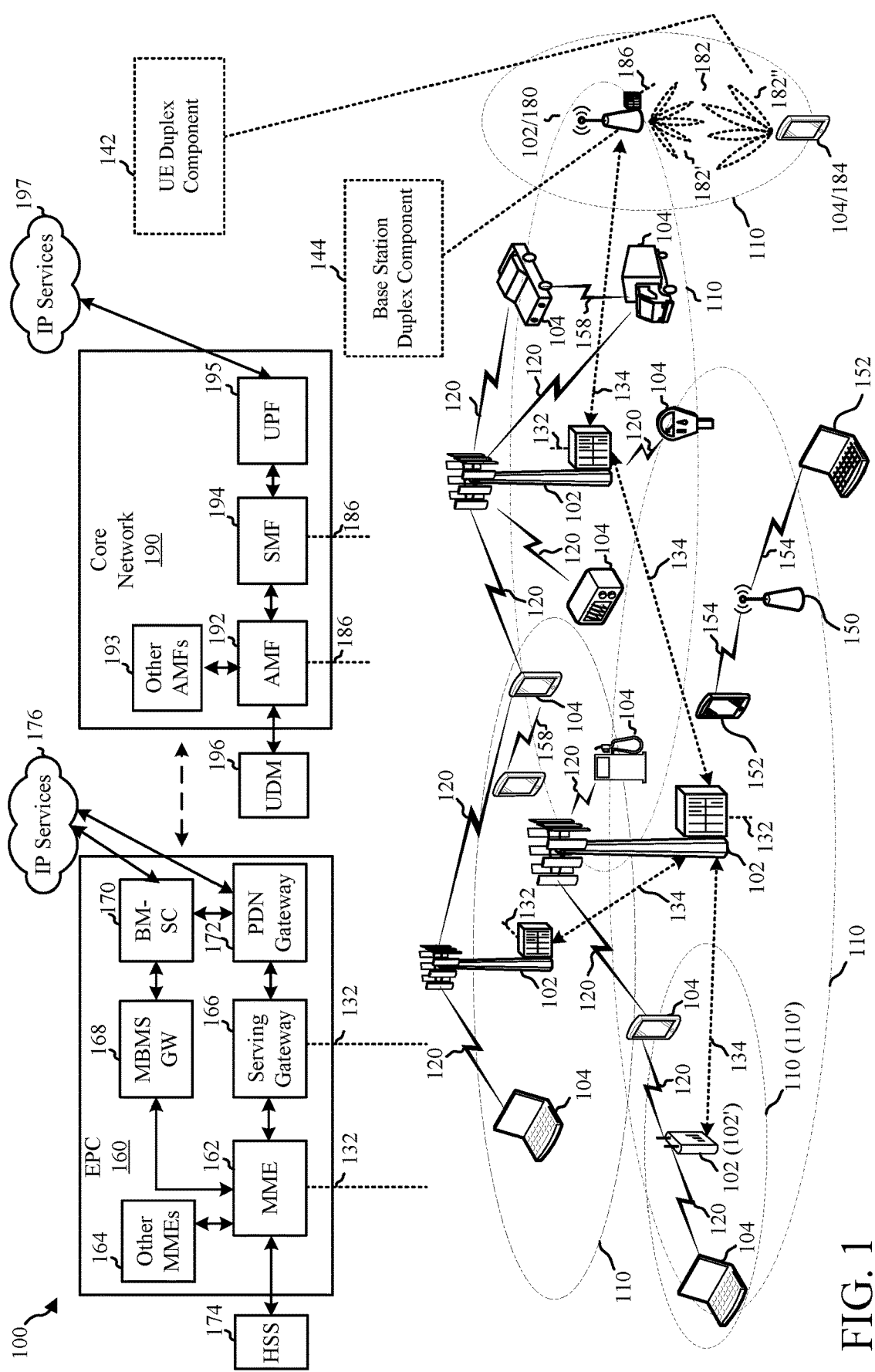
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

It would be beneficial to provide for FD communication in wireless communication networks, especially in networks employing TDD between base stations and user equipment (UE). FD communication in such circumstances may reduce latency (e.g., it would be possible to receive downlink (DL) signals in what are now uplink (UL) slots), increase spectrum efficiency, increase the efficiency of resource utilization, and enhance coverage.

In aspects of the present disclosure, methods, non-transitory computer readable media, and apparatuses are provided. In some examples of the technology disclosed herein, a user equipment (UE) reports, to a base station, duplex communication characteristics supported by the UE. The UE then communicates with the base station in accordance with the reported duplex communication characteristics. The characteristics can include duplex communication modes supported by the UE. The modes can include receiving and transmitting concurrently with the base station; communicating in a first direction with the base station and concurrently communicating in an opposite direction with a second base station; communicating with the base station in a first direction concurrent with the base station communicating in an opposite direction with another UE; and communicating in half duplex (HD) with the base station in HD. The UE can receive, from the base station, a command to communicate in a reported mode. In such cases, communicating, by the UE with the base station, in accordance with the reported duplex communication characteristics includes communicating with the base station in the commanded mode.

In some examples, the duplex communication characteristics further comprise duplex communication assistance information. In such examples, where the duplex communication mode is a full duplex mode, assistance information includes a capability of the UE to support one or more of: non-overlapping transmit and receive frequencies, partially overlapping transmit and receive frequencies, and fully-overlapping transmit and receive frequencies. In some such examples, where the assistance information includes a capability of the UE to support non-overlapping transmit frequencies and receive frequencies, the assistance information further comprises a minimum guard band between the non-overlapping transmit frequencies and receive frequencies. In some such examples, the minimum guard band is a function of the channels associated with the non-overlapping transmit frequencies and receive frequencies.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 186. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first, second and third backhaul links 132, 186 and 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. In some examples of the technology disclosed herein, both the DL and the UL between the base station and a UE use the same set of multiple beams to transmit/receive physical channels. For example, a given set of beams can carry the multiple copies of a Physical Downlink Shared Channel (PDSCH) on the DL and can carry multiple copies of a Physical Uplink Control Channel (PUCCH) on the UL.

The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR. The wireless communications system may further include a Wi-Fi access point (AP) in communication with Wi-Fi stations (STAs) 152 via communication links 154 in a 5 GHz unlicensed frequency spectrum. When communicating in an unlicensed frequency spectrum, the STAs 152/AP may perform a clear channel assessment (CCA) prior to communicating in order to determine whether the channel is available. The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in one or more frequency bands within the electromagnetic spectrum. The base station 180 and the UE 104 may each include a plurality of antennas, such as antenna elements, antenna panels, and/or antenna arrays to facilitate the beamforming.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF)

band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming with the UE 104/184 to compensate for the path loss and short range using beams 182.

The base station 180 may transmit a beamformed signal to the UE 104/184 in one or more transmit directions 182'. The UE 104/184 may receive the beamformed signal from the base station 180 in one or more receive directions 182". The UE 104/184 may also transmit a beamformed signal to the base station 180 in one or more transmit directions. The base station 180 may receive the beamformed signal from the UE 104 in one or more receive directions. The base station 180/UE 104/184 may perform beam training to determine the best receive and transmit directions for each of the base station 180/UE 104/184. The transmit and receive directions for the base station 180 may or may not be the same. The transmit and receive directions for the UE 104/184 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Continuing to refer to FIG. 1, in certain aspects, the technology disclosed herein is method of wireless communication, in which a user equipment (UE) reports, to a base station, duplex communication characteristics supported by the UE. The UE then communicates with the base station in accordance with the reported duplex communication characteristics. The characteristics can include duplex communication modes supported by the UE. The modes can include receiving and transmitting concurrently with the base station; communicating in a first direction with the base station and concurrently communicating in an opposite direction with a second base station; communicating with the base station in a first direction concurrent with the base station communicating in an opposite direction with another UE; and communicating in half duplex (HD) with the base station in HD. The UE can receive, from the base station, a command to communicate in a reported mode. In such cases, communicating, by the UE with the base station, in accordance with the reported duplex communication characteristics includes communicating with the base station in the commanded mode.

In some examples, the duplex communication characteristics further comprise duplex communication assistance information. In such examples, where the duplex communication mode is a full duplex mode, assistance information includes a capability of the UE to support one or more of: non-overlapping transmit and receive frequencies, partially overlapping transmit and receive frequencies, and fully-overlapping transmit and receive frequencies. In some such examples, where the assistance information includes a capability of the UE to support non-overlapping transmit frequencies and receive frequencies, the assistance information further comprises a minimum guard band between the non-overlapping transmit frequencies and receive frequencies. In some such examples, the minimum guard band is a function of the channels associated with the non-overlapping transmit frequencies and receive frequencies Such methods can be performed by one or more of the UE 350 and base station 310 components, including UE duplex component 142 and base station duplex component 144.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu 0$ to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS). Some examples of the technology disclosed herein use the DM-RS of the physical downlink control channel (PDCCH) to aid in channel estimation (and eventual demodulation of the user data portions) of the physical downlink shared channel (PDSCH).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK)/negative ACK (NACK) feedback. The PUSCH carries data and may additionally be used to carry a buffer status report (BSR), a power headroom report (PHR), and/or UCI.

Figure 3:
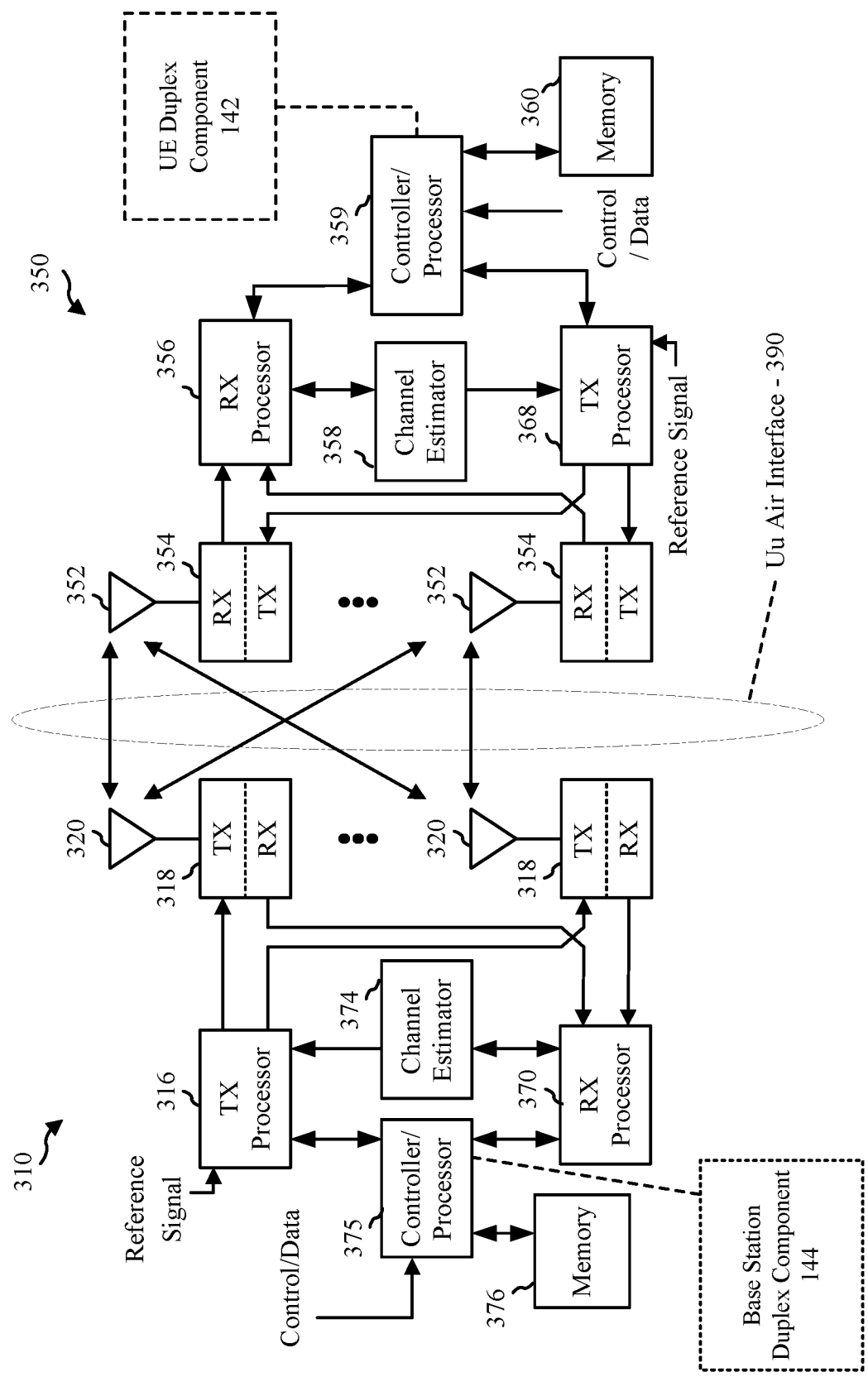
FIG. 3 is a diagram illustrating a base station and user equipment (UE) in an access network, in accordance with examples of the technology disclosed herein.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations. As described elsewhere herein, the interface between a UE 350 and a base station 310 can be referred to as a "Uu" interface 390.

Continuing to refer to FIG. 3, and continuing to refer to prior figures for context, in certain aspects, the technology disclosed herein is method of wireless communication, in which a user equipment (UE) reports, to a base station, duplex communication characteristics supported by the UE. The UE then communicates with the base station in accordance with the reported duplex communication characteristics. The characteristics can include duplex communication modes supported by the UE. The modes can include receiving and transmitting concurrently with the base station; communicating in a first direction with the base station and concurrently communicating in an opposite direction with a second base station; communicating with the base station in a first direction concurrent with the base station communicating in an opposite direction with another UE; and communicating in half duplex (HD) with the base station in HD. The UE can receive, from the base station, a command to communicate in a reported mode. In such cases, communicating, by the UE with the base station, in accordance with the reported duplex communication characteristics includes communicating with the base station in the commanded mode.

In some examples, the duplex communication characteristics further comprise duplex communication assistance information. In such examples, where the duplex communication mode is a full duplex mode, assistance information includes a capability of the UE to support one or more of: non-overlapping transmit and receive frequencies, partially overlapping transmit and receive frequencies, and fully-overlapping transmit and receive frequencies. In some such examples, where the assistance information includes a capability of the UE to support non-overlapping transmit frequencies and receive frequencies, the assistance information further comprises a minimum guard band between the non-overlapping transmit frequencies and receive frequencies. In some such examples, the minimum guard band is a function of the channels associated with the non-overlapping transmit frequencies and receive frequencies Such methods can be performed by one or more of the UE 350 and base station 310 components, including UE duplex component 142 and bas station duplex component 144.

Figure 4:
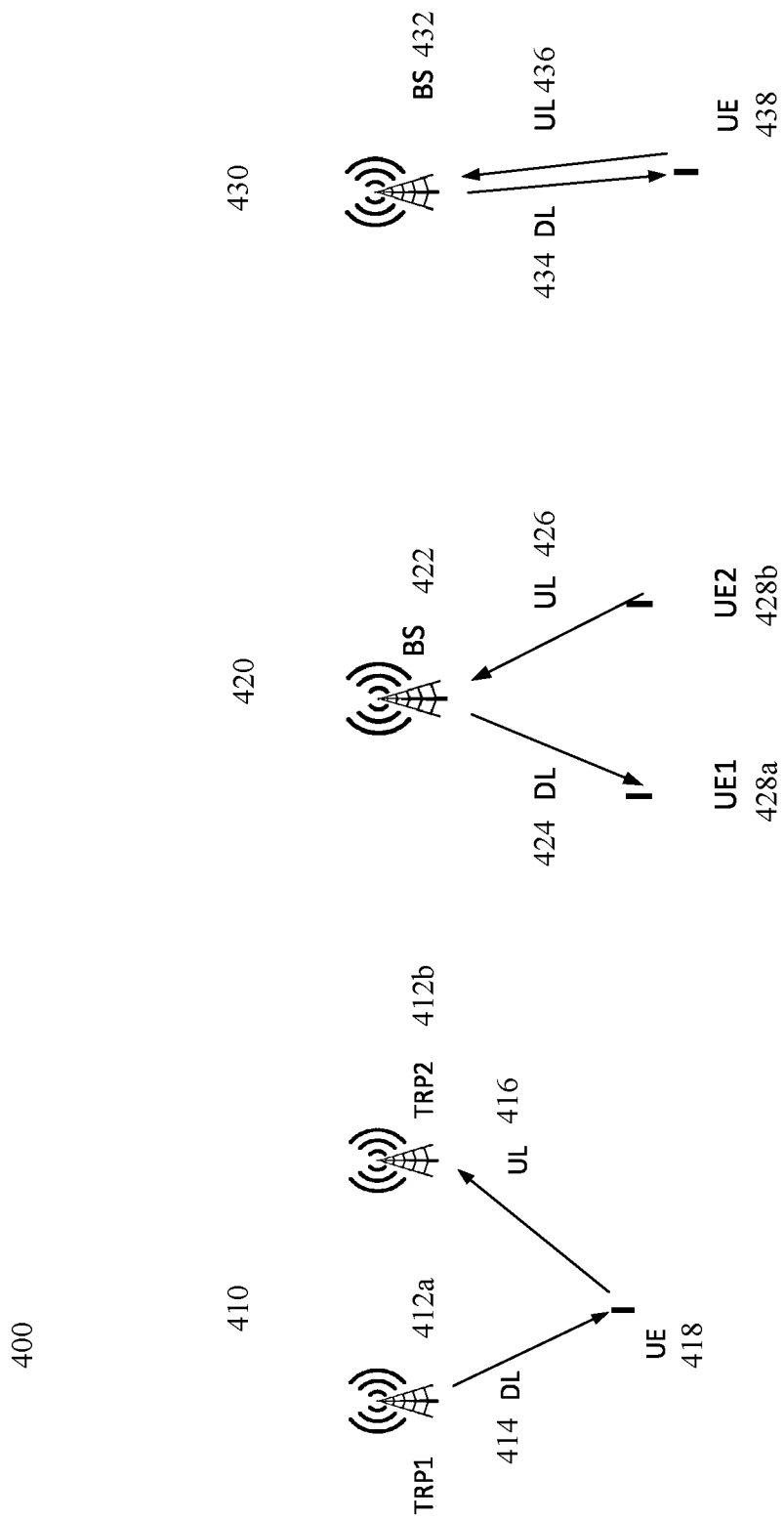
FIG. 4 is a diagram illustrating example use cases for FD in a wireless telecommunication network, in accordance with examples of the technology disclosed herein.

FIG. 4 illustrates example use cases 400 for FD in a wireless telecommunication network, such as network 100. In a first use case 410, UE 418 (e.g., UE 104/184) is in a full duplex mode to communicate with transmission/reception point (TRP) 412a (e.g., 102/108) over downlink (DL) 414 (e.g., 182'), while at the same time communicating with TRP 412b over uplink (UL) 416. In use case 410, TRP 412a and TRP 412b may be, or may not be, co-located or quasi-collocated.

In use case 420, a base station 422 is in a full duplex mode to communicate separately with UE 428a over DL 424, and with UE 428b in UL 426. From the point of view of each of UE 428a and UE 428b, the UE is in an HD duplex mode. While the full duplex nature of case 420 may be mostly transparent to each of UE 428a and UE 428b, each UE may still need to report its FD characteristics to the network. For example, base station 422 may be transmitting a synchronization signal block (SSB) to UE 428a and receiving PUSCH from UE 428b in the same frame, slot, or symbol. In use case 430, a base station 422 is in full duplex mode to communicate with UE 438 (also in full duplex mode) over DL 434 and UL 436 at the same time.

Figure 5:
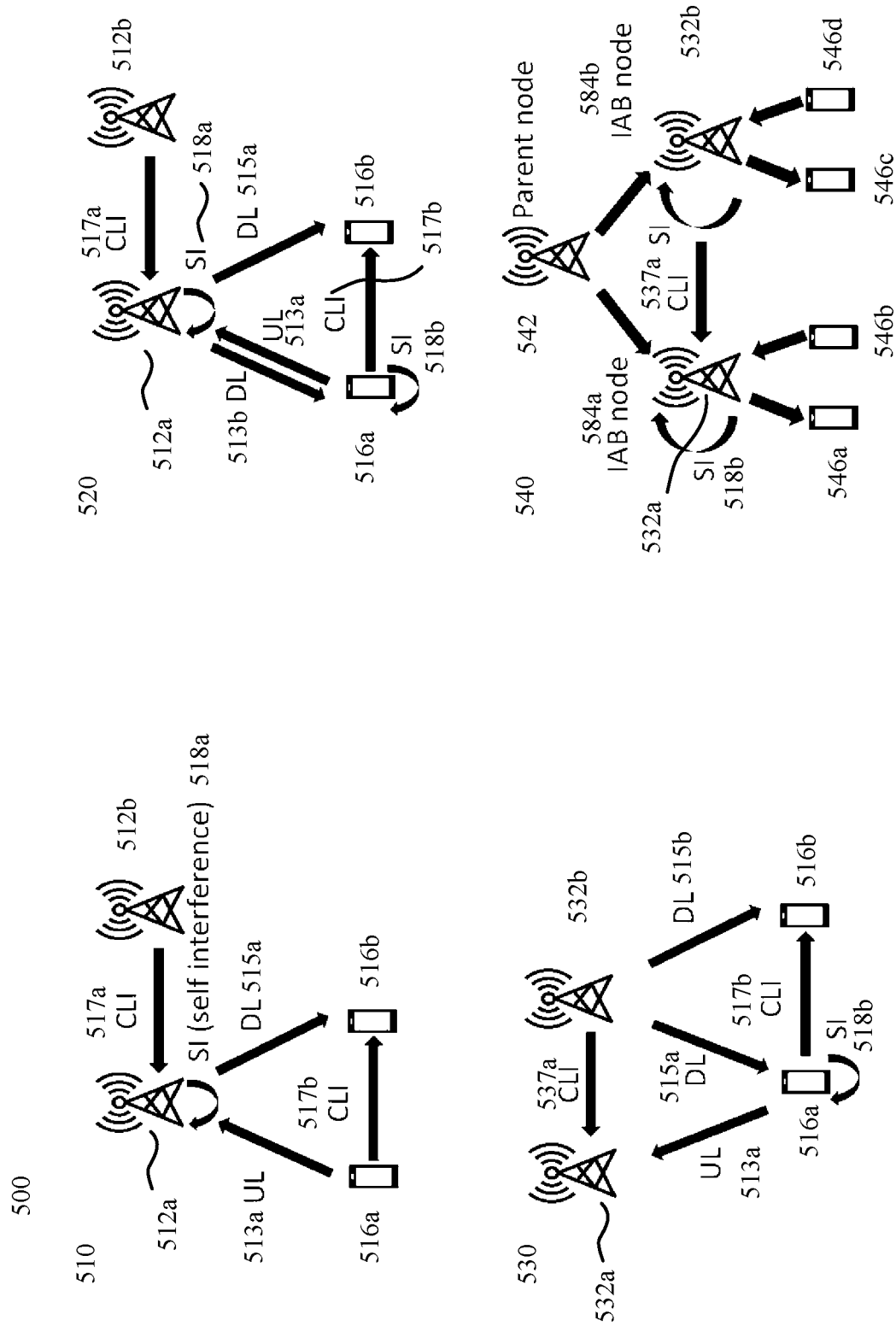
FIG. 5 is a diagram illustrating example deployment scenarios for FD in a wireless communication network, in accordance with examples of the technology disclosed herein.

FIG. 5 illustrates example deployment scenarios 500 for FD in a wireless communication network. In a first scenario 510, base station 512a is operating in FD mode in uplink (UL) 513a from UE 516a and in downlink (DL) 515a to UE 516b. In addition, interference is experience by base station 512a as cross link interference (CLI) 517a from base station 512b and as self-interference (SI) 518a. In addition, UE 516b experiences CLI 517b from nearby UE 516a in the first scenario 510.

In a second scenario 520, base station 512a is operating in FD mode in uplink (UL) 513a from UE 516a and in DL 513b to UE 516a. As in scenario 510, interference still is experienced by base station 512a as cross link interference (CLI) 517a from base station 512b and as self-interference (SI) 518a. UE 516b experiences CLI 517b from nearby UE 516a. Further, UE 516a experiences self-interference (SI) 518b based on the UL 513a transmission.

In a third scenario 530, the base station 532 (not indicated separately) includes transmission/reception points (TRPs) TRP 532a and TRP 532b. During the period shown, TRP 532b is transmitting in HD mode in DL 515a to UE 516a and in DL 515b to UE 516b. TRP 532a is receiving in HD mode over UL 513a from UE 516a, and experiencing cross-link interference 537a from TRP 532b due to one or more of transmission of DL 515a and DL 515b from TRP 532b. UE 516a is communicating in FD mode by transmitting over UL 513a to TRP 532a and receiving over DL 515a from TRP 532b. UE 516a also is experiencing self-interference (SI) 518b due to its transmission over UL 513a, and is causing cross-link interference (CLI) at nearby UE 516b.

In a fourth scenario, the a parent node 542 is in backhaul communication with TRP 532a and TRP 532b over integrated access backhaul (IAB) link 584a and IAB link 584b, respectively. In this scenario, IAB node 532a, 532b is in FD mode. E.g. for 532a node, it is Tx to 546a, and also Rx from 542 simultaneously. In IAB, part of the wireless spectrum is used for the backhaul connection with base stations instead of physical fiber optic cable. IAB link 584a and backhaul link 584b can be full duplex. In scenario 540, base station 532a is in duplex communication with UE 546a and UE 546b in a fashion similar to that of scenario 510, and base station 532b is in duplex communication with UE 546c and UE 546d in a fashion similar to that of scenario 510.

Figure 6:
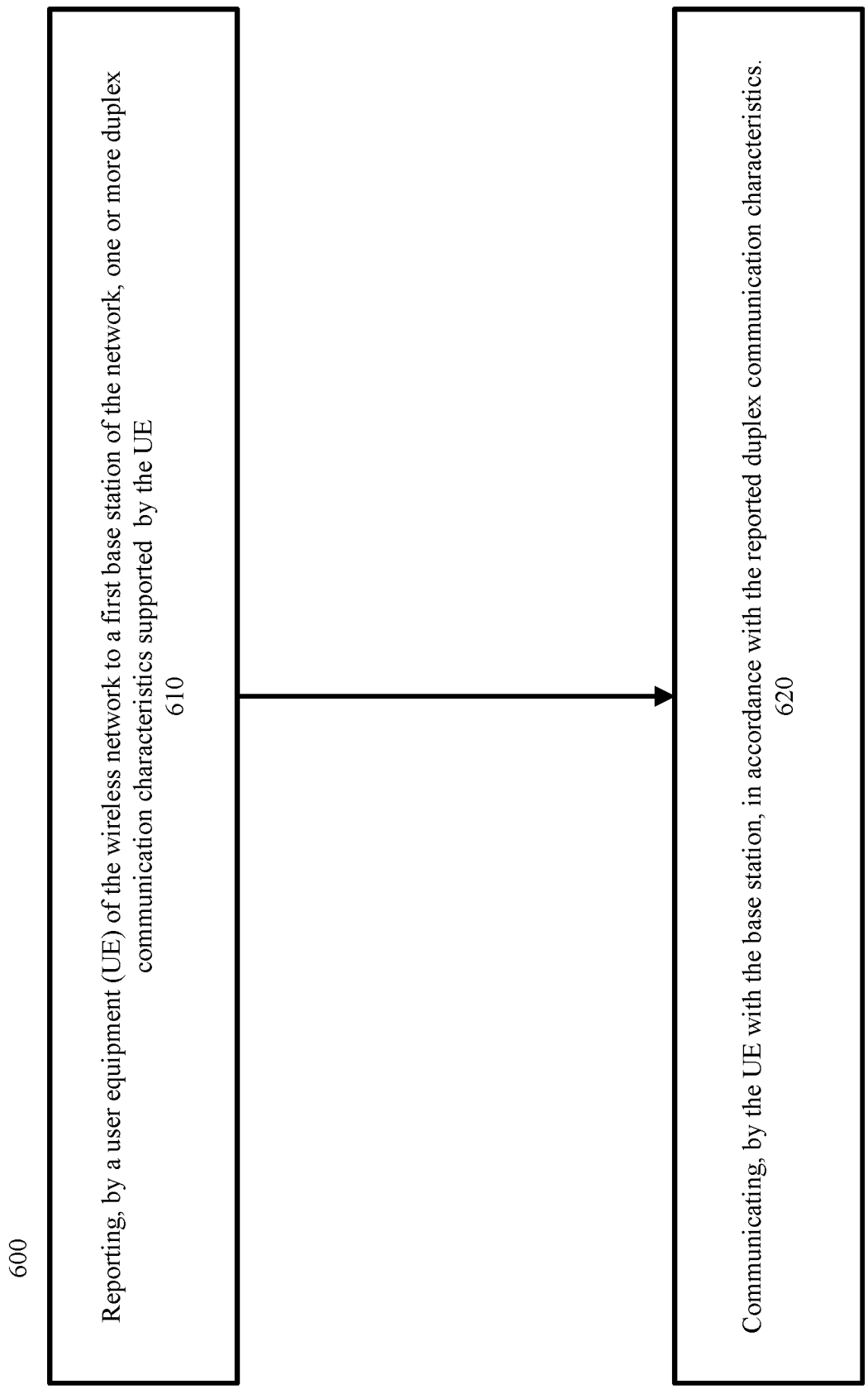
FIG. 6 is a flowchart of methods of wireless communication is shown, in accordance with examples of the technology disclosed herein.

Referring to FIG. 6, and continuing to refer to prior figures for context, methods 600 for wireless communication are illustrated, in accordance with examples of the technology disclosed herein. In such methods, a user equipment (UE) of a wireless network reports, to a base station of the network, one or more duplex communication characteristics supported by the UE—Block 610. In some examples, the duplex communication characteristics include one or more communication modes supported by the UE. In some such examples, the one or more communication modes include: receiving and transmitting concurrently with the base station (a full duplex mode); communicating in a first direction with the base station and concurrently communicating in an opposite direction with a second base station (a full duplex mode); communicating with the base station in a first direction concurrent with the base station communicating in an opposite direction with another UE; and communicating in half duplex (HD) with the base station in HD. In some examples, the UE can report one or more preferred UE duplex communication characteristics (in some cases, ordered preferences) from among a plurality of supported UE duplex communication characteristics.

In some examples, the duplex communication characteristics further comprise duplex communication assistance information. In some such examples, where the duplex communication mode is a full duplex mode, assistance information includes an indication of a capability of the UE to support one or more of: non-overlapping transmit and receive frequencies, partially overlapping transmit and receive frequencies, and fully-overlapping transmit and receive frequencies. In some such examples where the assistance information comprises a capability of the UE to support non-overlapping transmit frequencies and receive frequencies, the assistance information further includes a minimum guard band between the non-overlapping transmit frequencies and receive frequencies. In some such examples, the minimum guard band is a function of the channels associated with the non-overlapping transmit frequencies and receive frequencies. For example, receiving SSB in UL and PUSCH in downlink can require different minimum guard bands that communicating PDSCH in DL and RO in UL. For example, receiving a synchronization signal block (SSB) in uplink and a physical uplink shared channel (PUSCH) in downlink. As another example, receiving a physical downlink shared channel (PDSCH) in downlink and transmitting during a random access channel (RACH) occasion (RO) in uplink. Further the minimum guard band can be one of i) predefined in the UE, and ii) specified by the base station.

In a continuing example, and referring to scenario 520, UE 516a uses an RRC message, for example to report to base station 512a that it is capable of each duplex communication mode listed above, and that it prefers to communicate in an FD mode that includes receiving and transmitting at the same time with base station 512a. UE 516a additionally reports duplex communication assistance information to base station 512a, such as that for any FD mode it requires non-overlapping transmit and receive frequencies, with a first specific guard band (e.g., e.g. some number of resource blocks (RBs), e.g. 20 RBs) between the transmit and receive frequencies for communicating SSB in UL and PUSCH in downlink and a second minimum guard band for communicating PDSCH in DL and RO in UL. While the continuing example related to a certain Connected mode of operation, the technology disclosed herein covers other modes and circumstances, e.g., a change of UE or network configuration, a change of UE power or power settings, and a change in received signal strength.

Also in the continuing example, UE 516b reports that it prefers to communicate with base station 512a in a first direction concurrent with base station 512a communicating in an opposite direction with another UE, such as UE 516a, and that it is capable of communicating in each other possible duplex communication mode. In other examples, the "base station" can be a TRP—the terms are used interchangeably in this disclosure. In other examples, each UE determined its mode preference and assistance information from one or more of: measurements performed at the UE, existing UE configurations (including configurations set at manufacturing), or commands from the network. In general, reporting UE duplex communication characteristics (including, in some cases, preferences) to the network allows the network to consider each UE in its coverage area, and then command UE duplex communication configuration based on the reported characteristics.

Figure 8:
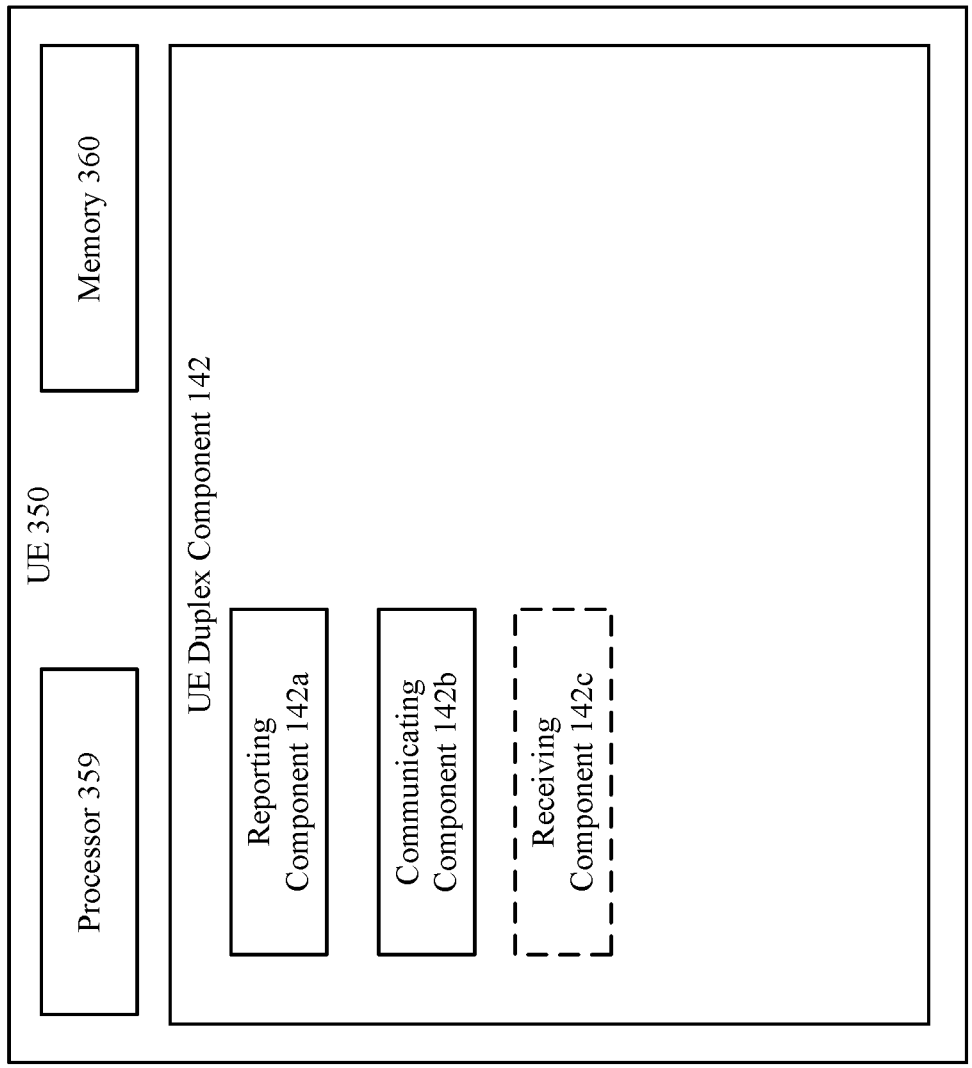
FIG. 8 is a block diagram of a UE, in accordance with examples of the technology disclosed herein.

Referring to FIG. 8, and continuing to refer to prior figures for context, another representation of the UE 350 for wireless communication of FIG. 3 is shown, in accordance with examples of the technology disclosed herein. UE 350 includes UE duplex component 142, controller/processor 359, and memory 360, as described in conjunction with FIG. 3 above. UE duplex component 142 includes reporting component 142a. In some examples, the reporting component 142a reports, to a base station of the network, one or more duplex communication characteristics supported by the UE. Accordingly, reporting component 142a may provide means for reporting, to a base station of the network, one or more duplex communication characteristics supported by the UE.

Referring again to FIG. 6, the UE communicates with the base station in accordance with the reported duplex communication characteristics—Block 620. In the continuing example, UE 516a communicates with base station 512a in FD over UL 513a and DL 513b, with non-overlapping transmit and receive frequencies separated by a first specific guard band between the transmit and receive frequencies for communicating SSB in UL and PUSCH in downlink and a second minimum guard band for communicating PDSCH in DL and RO in UL. UE 516b, which had separately reported to base station 512b, communicates with 512b in HD, but with the ability to tolerate base station 512b communicating in FD with UE 516a. In this case, UE 516b can obey relaxed DL/UL channel/RS multiplexing. For example, such multiplexing can include supporting SSB (DL) and PUSCH (UL) on the same symbol.

Referring to FIG. 8, and continuing to refer to prior figures for context, UE duplex component 142 includes communicating component 142b. In some examples, the communicating component 142a communicates with the base station in accordance with the reported duplex communication characteristics. Accordingly, reporting component 142a may provide means for communicating with the base station in accordance with the reported duplex communication characteristics.

Figure 7:
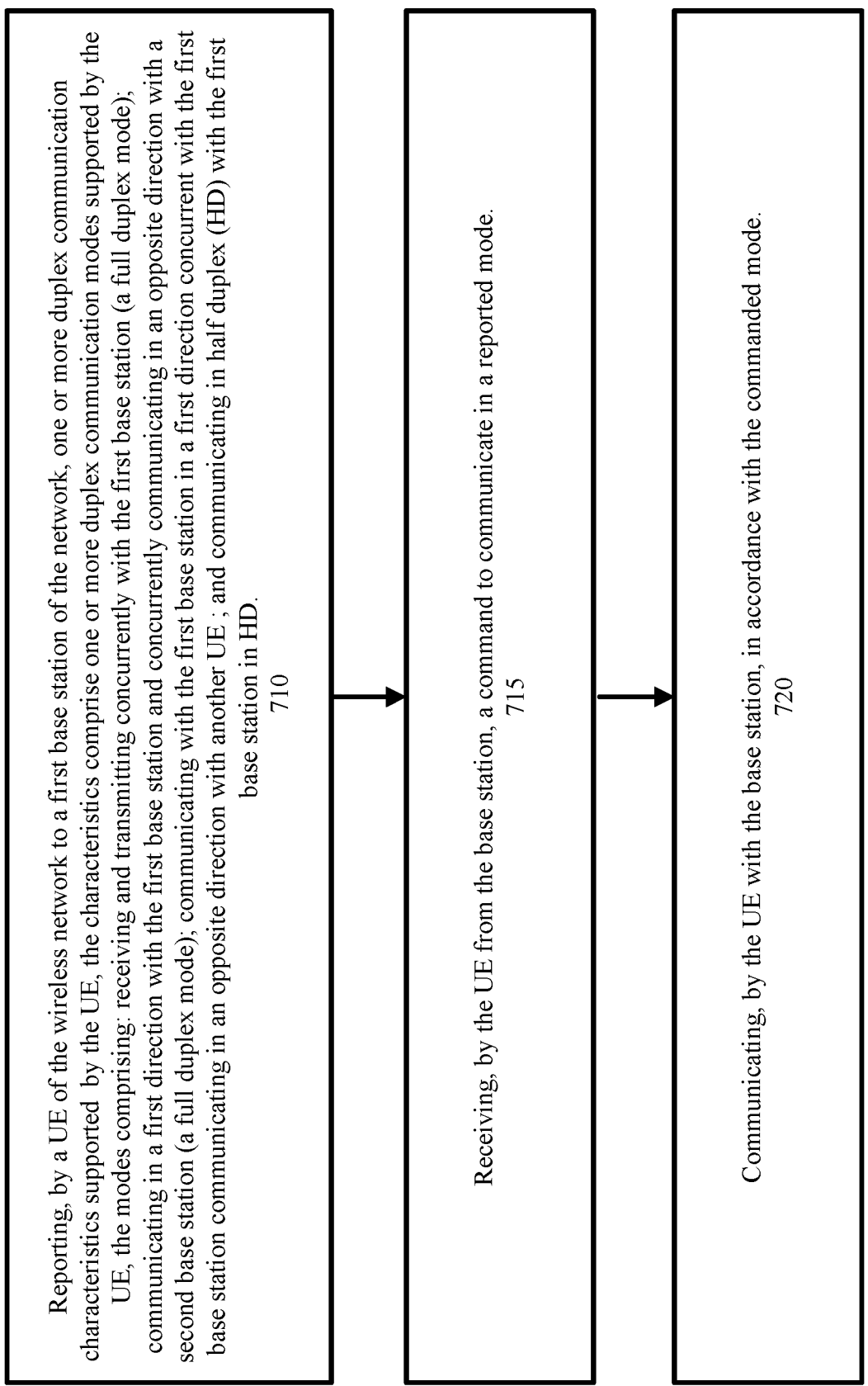
FIG. 7 is a flowchart of methods of wireless communication is shown, in accordance with examples of the technology disclosed herein.

Referring to FIG. 7, and continuing to refer to prior figures for context, methods 700 for wireless communication are illustrated, in accordance with examples of the technology disclosed herein. In such methods, the UE reports, to a base station of the network, one or more duplex communication characteristics supported by the UE; wherein the characteristics comprise one or more duplex communication modes supported by the UE, and the modes comprise: receiving and transmitting concurrently with the base station (a full duplex mode); communicating in a first direction with the base station and concurrently communicating in an opposite direction with a second base station (a full duplex mode); communicating with the base station in a first direction concurrent with the base station communicating in an opposite direction with another UE; and communicating in half duplex (HD) with the base station in HD—Block 710. Referring to FIG. 8, this block represents a variation on reporting component 142a.

Referring again to FIG. 7, the UE receives, from the base station, a command to communicate in a reported mode—Block 715. In a variation on the continuing example, base station 512a determines that CLI 517 and SI 518 present an amount of interference that is incompatible with the reported preference of UE 516a to communicate in its preferred duplex communication mode, i.e., receiving and transmitting at the same time with base station 512a. Base station 512a transmits, and UE 516a receives, a command to communicate with base station 512a in a first direction concurrent with base station 512a communicating in an opposite direction with another UE, such as UE 516a.

Referring to FIG. 8, and continuing to refer to prior figures for context, UE duplex component 142 includes receiving component 142c. In some examples, the receiving component 142c receives, from the base station, a command to communicate in a reported mode. Accordingly, reporting component 142a may provide means for receiving, from the base station, a command to communicate in a reported mode.

Figure 9:
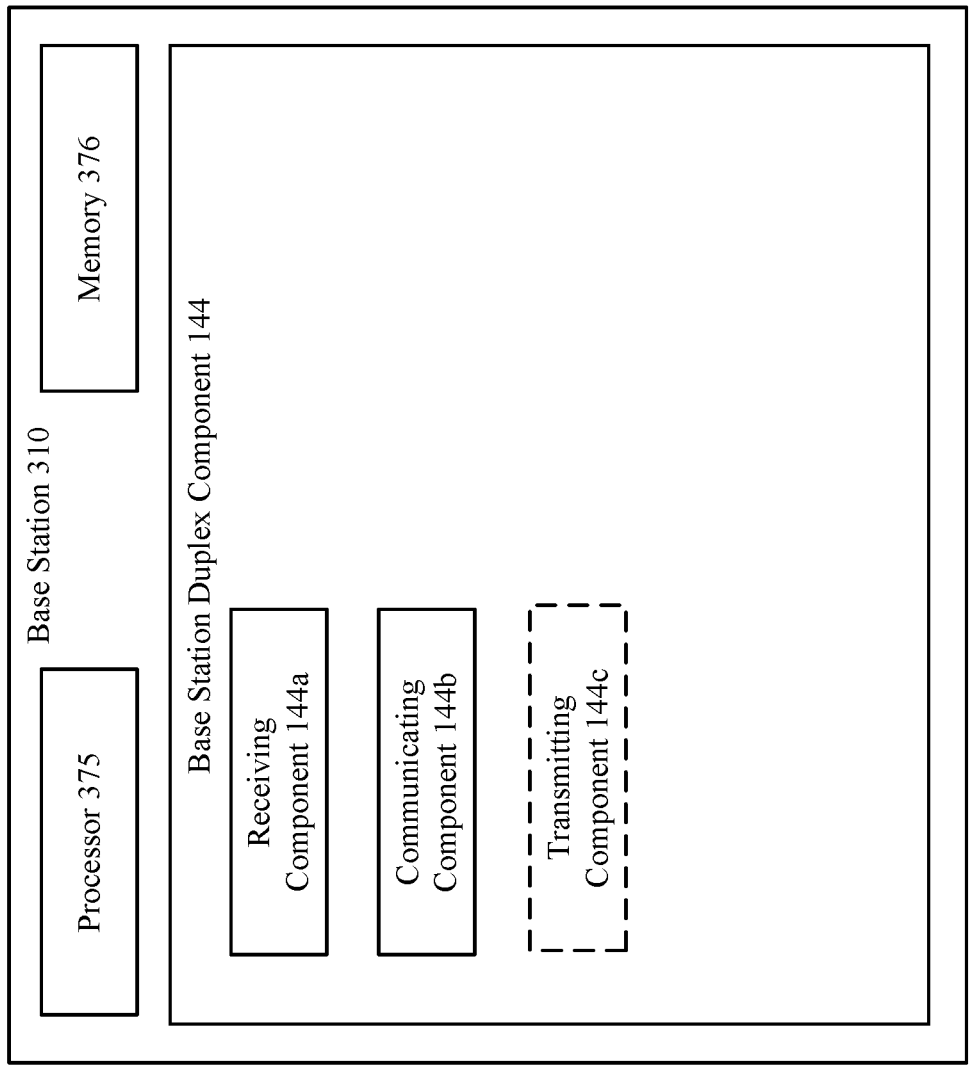
FIG. 9 is a block diagram of a base station, in accordance with examples of the technology disclosed herein.

Referring again to FIG. 7, the UE communicates with the base station in accordance with the commanded mode—Block 620. In the continuing example, both UE 516a and UE 516b communicate with 512b in HD, but with the ability to tolerate base station 512b communicating in FD with the other UE 516a. In this case, both UE 516a and UE 516b can obey relaxed DL/UL channel/RS multiplexing. For example, such multiplexing can include supporting SSB (DL) and PUSCH (UL) on the same symbol. Referring to FIG. 8, this block represents a variation on communicating component 142b Referring to FIG. 9, and continuing to refer to prior figures for context, another representation of the base station 310 for wireless communication of FIG. 3 is shown, in accordance with examples of the technology disclosed herein. Base station 310 (e.g., a gNB, a TRP) includes base station duplex component 144, controller/processor 375, and memory 376, as described in conjunction with FIG. 3 above. Base station duplex component 144 includes receiving component 144a. In some examples, the receiving component 144a receives, by a base station of the wireless network from a UE of the network, one or more duplex communication characteristics supported by the UE. Accordingly, receiving component 144a may provide means for receives, by a base station of the wireless network from a UE of the network, one or more duplex communication characteristics supported by the UE. In some examples, the characteristics include one or more duplex communication modes supported by the UE, the modes comprising: receiving and transmitting concurrently with the base station (a full duplex mode); communicating in a first direction with the base station and concurrently communicating in an opposite direction with a second base station (a full duplex mode); communicating with the base station in a first direction concurrent with the base station communicating in an opposite direction with another UE; and communicating in half duplex (HD) with the base station in HD. In some such examples, the duplex communication characteristics further comprise duplex communication assistance information. In some such examples, the duplex communication mode is a full duplex mode; and assistance information comprises a capability of the UE to support one or more of: non-overlapping transmit and receive frequencies, partially overlapping transmit and receive frequencies, and fully-overlapping transmit and receive frequencies. In some such examples, the assistance information comprises a capability of the UE to support non-overlapping transmit frequencies and receive frequencies; and the assistance information further comprises a minimum guard band between the non-overlapping transmit frequencies and receive frequencies. In some such examples, the minimum guard band is a function of the channels associated with the non-overlapping transmit frequencies and receive frequencies.

Base station duplex component 144 also includes communicating component 144b. In some examples, the communicating component 144b communicates with the UE in accordance with the reported duplex communication characteristics. Accordingly, communicating component 144b may provide means for communicating, by the base station with the UE, in accordance with the reported duplex communication characteristics.

Base station duplex component 144 includes transmitting component 144c. In some examples, the transmitting component 144c transmits, to the UE, a command to communicate in a reported mode. Accordingly, transmitting component 144c may provide means for transmitting, by the base station to the UE, a command to communicate in a reported mode. In such examples, communicating component 144b, communicates with the UE in accordance with the reported duplex communication characteristics comprises communicating with the base station in the commanded mode.

The following examples are illustrative only and aspects thereof may be combined with aspects of other embodiments or teaching described herein, without limitation.

Example 1 includes methods, apparatuses, and computer readable media for wireless communication, in which a UE of a wireless network reports, to a base station of the network, one or more duplex communication characteristics supported by the UE. The UE then communicates with the base station in accordance with the reported duplex communication characteristics.

Example 2 includes the Example 1, wherein the characteristics comprise one or more duplex communication modes supported by the UE, the modes including: receiving and transmitting concurrently with the base station (a full duplex mode); communicating in a first direction with the base station and concurrently communicating in an opposite direction with a second base station (a full duplex mode); communicating with the base station in a first direction concurrent with the base station communicating in an opposite direction with another UE; and communicating in half duplex (HD) with the base station in HD.

Example 3 includes any one or more of Example 1 and Example 2, wherein the UE receives, from the base station, a command to communicate in a reported mode, and wherein communicating, by the UE with the base station, in accordance with the reported duplex communication characteristics includes communicating with the base station in the commanded mode.

Example 4 includes any one or more of Example 1-Example 3, wherein the duplex communication characteristics further comprise duplex communication assistance information. Example 5 includes any one or more of Example 1-Example 4, wherein the duplex communication mode is a full duplex mode; and assistance information comprises a capability of the UE to support one or more of: non-overlapping transmit and receive frequencies, partially overlapping transmit and receive frequencies, and fully-overlapping transmit and receive frequencies. Example 6 includes any one or more of Example 1-Example 5, wherein the assistance information includes a capability of the UE to support non-overlapping transmit frequencies and receive frequencies; and the assistance information further comprises a minimum guard band between the non-overlapping transmit frequencies and receive frequencies. Example 7 includes any one or more of Example 1-Example 6, wherein the minimum guard band is a function of the channels associated with the non-overlapping transmit frequencies and receive frequencies.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

We claim:

1. A wireless communication method, comprising:
   reporting, by a user equipment (UE) of a wireless network to a base station of the network, one or more duplex communication characteristics supported by the UE, wherein the one or more duplex communication characteristics comprise one or more duplex communication modes including at least a mode of communicating in a first direction with the base station and concurrently communicating in an opposite direction with a second base station;
   receiving, by the UE from the base station, a command to communicate in a reported mode; and
   communicating, by the UE with the base station, in accordance with the commanded mode.

2. The method of claim 1, wherein:
   the duplex communication mode is a full duplex mode; and
   duplex communication characteristics comprise a capability of the UE to support one or more of: non-overlapping transmit and receive frequencies, partially overlapping transmit and receive frequencies, and fully-overlapping transmit and receive frequencies.

3. The method of claim 2, wherein:
   the duplex communication characteristics comprise a capability of the UE to support non-overlapping transmit frequencies and receive frequencies; and
   the duplex communication characteristics comprise a minimum guard band between the non-overlapping transmit frequencies and receive frequencies.

4. The method of claim 3, wherein the minimum guard band is a function of one or more channels associated with the non-overlapping transmit frequencies and receive frequencies.

5. The method of claim 4, wherein the one of more channels comprise one of i) a synchronization signal block (SSB) and a physical uplink shared channel (PUSCH), and ii) a physical downlink shared channel (PDSCH) and random access channel (RACH) occasion (RO).

6. The method of claim 4, wherein the minimum guard band is one of i) predefined and ii) specified by the base station.

7. An apparatus for wireless communication, comprising:
   a memory; and
   at least one processor coupled to the memory, the memory including instructions executable by the at least one processor to cause the apparatus to:
      report, by a user equipment (UE) of a wireless network to a base station of the network, one or more duplex communication characteristics supported by the UE, wherein the one or more duplex communication characteristics comprise one or more duplex communication modes;
      receiving, by the UE from the base station, a command to communicate in a reported mode; and
      communicate, by the UE with the base station, in accordance with the reported duplex communication characteristics the commanded mode.

8. The apparatus of claim 7, wherein the characteristics comprise one or more duplex communication modes supported by the UE, the modes comprising:
   receiving and transmitting concurrently with the base station (a full duplex mode);
   communicating in a first direction with the base station and concurrently communicating in an opposite direction with a second base station (a full duplex mode);
   communicating with the base station in a first direction concurrent with the base station communicating in an opposite direction with another UE; and
   communicating in half duplex (HD) with the base station in HD.

9. The apparatus of claim 8, wherein:
   the memory further includes instructions executable by the at least one processor to cause the apparatus to receive, by the UE from the base station, a command to communicate in a reported mode,
   wherein communicating, by the UE with the base station, in accordance with the reported duplex communication characteristics comprises communicating with the base station in the commanded mode.

10. The apparatus of claim 8, wherein:
   the duplex communication characteristics comprise a capability of the UE to support non-overlapping transmit frequencies and receive frequencies; and
   the duplex communication characteristics comprise a minimum guard band between the non-overlapping transmit frequencies and receive frequencies.

11. The apparatus of claim 10, wherein the minimum guard band is a function of one or more channels associated with the non-overlapping transmit frequencies and receive frequencies.

12. A non-transitory computer-readable medium storing processor-executable code, the code when read and executed by at least one processor of an apparatus, causes the apparatus to:
- report, by a user equipment (UE) of a wireless network to a first transmission/reception point (base station) of the network, one or more duplex communication characteristics supported by the UE, wherein the one or more duplex communication characteristics comprise one or more duplex communication modes including at least communicating in a first direction with the base station and concurrently communicating in an opposite direction with a second base station;
- receiving, by the UE from the base station, a command to communicate in a reported mode; and
- communicate, by the UE with the base station, in accordance with the commanded mode.

13. The non-transitory computer-readable medium of claim 12, wherein:
- the code when read and executed by at least one processor of an apparatus, further causes the apparatus to receive, by the UE from the base station, a command to communicate in a reported mode,
- wherein communicating, by the UE with the base station, in accordance with the reported duplex communication characteristics comprises communicating with the base station in the commanded mode.

14. The non-transitory computer-readable medium of claim 12, wherein:
- the duplex communication mode is a full duplex mode; and
- duplex communication characteristics comprise a capability of the UE to support one or more of: non-overlapping transmit and receive frequencies, partially overlapping transmit and receive frequencies, and fully-overlapping transmit and receive frequencies.

15. The non-transitory computer-readable medium of claim 14, wherein:
- duplex communication characteristics comprise a capability of the UE to support non-overlapping transmit frequencies and receive frequencies; and
- duplex communication characteristics further comprise a minimum guard band between the non-overlapping transmit frequencies and receive frequencies.

16. The non-transitory computer-readable medium of claim 15, wherein the minimum guard band is a function of one or more channels associated with the non-overlapping transmit frequencies and receive frequencies.

17. An apparatus for wireless communications, comprising:
- means for reporting, by a user equipment (UE) of a wireless network to a base station of the network, one or more duplex communication characteristics supported by the UE wherein the one or more duplex communication characteristics comprise one or more duplex communication modes;
- receiving, by the UE from the base station, a command to communicate in a reported mode; and
- means for communicating, by the UE with the base station, in accordance with the commanded mode.

18. The apparatus of claim 17, wherein the characteristics comprise one or more duplex communication modes supported by the UE, the modes comprising:
- receiving and transmitting concurrently with the base station (a full duplex mode);
- communicating in a first direction with the base station and concurrently communicating in an opposite direction with a second base station (a full duplex mode);
- communicating with the base station in a first direction concurrent with the base station communicating in an opposite direction with another UE; and
- communicating in half duplex (HD) with the base station in HD.

19. The apparatus of claim 18, wherein:
- the duplex communication mode is a full duplex mode; and
- duplex communication characteristics comprise a capability of the UE to support one or more of: non-overlapping transmit and receive frequencies, partially overlapping transmit and receive frequencies, and fully-overlapping transmit and receive frequencies.

20. The apparatus of claim 19, wherein:
- the duplex communication characteristics comprise a capability of the UE to support non-overlapping transmit frequencies and receive frequencies; and
- the duplex communication characteristics further comprise a minimum guard band between the non-overlapping transmit frequencies and receive frequencies.

21. The apparatus of claim 20, wherein the minimum guard band is a function of one or more channels associated with the non-overlapping transmit frequencies and receive frequencies.

* * * * *